US006746054B2

United States Patent
Gagnon et al.

(10) Patent No.: US 6,746,054 B2
(45) Date of Patent: Jun. 8, 2004

(54) CONNECTION FORMED BY ENGAGEMENT OF A TUBE AND A VALVE SURFACE

(75) Inventors: Frederic Gagnon, Chatham (CA); Peter Hueniken, Chatham (CA); Kenneth Peter Nydam, Chatham (CA); Robert Faulkner, Chatham (CA)

(73) Assignee: Siemens Automotive Inc. (CA)

( * ) Notice: Subject to any disclaimer, the term of this patent is extended or adjusted under 35 U.S.C. 154(b) by 0 days.

(21) Appl. No.: 09/893,529

(22) Filed: Jun. 29, 2001

(65) Prior Publication Data

US 2002/0041097 A1 Apr. 11, 2002

Related U.S. Application Data

(63) Continuation-in-part of application No. 09/689,897, filed on Oct. 13, 2000, now Pat. No. 6,505,614
(60) Provisional application No. 60/159,397, filed on Oct. 14, 1999.

(51) Int. Cl.$^7$ .......................... F16L 41/08; F02M 25/07
(52) U.S. Cl. ...................... 285/222; 285/189; 285/192
(58) Field of Search .............................. 285/222, 382.5, 285/189, 192, 209; 123/568.11

(56) References Cited

U.S. PATENT DOCUMENTS

| | | | | |
|---|---|---|---|---|
| 2,460,580 A | * | 2/1949 | Huber ....................... 29/421.1 |
| 3,428,338 A | * | 2/1969 | Corwin ........................ 285/39 |
| 3,778,090 A | * | 12/1973 | Tobin ......................... 285/222 |
| 3,787,945 A | * | 1/1974 | Pasek et al. ........... 29/890.044 |
| 4,006,524 A | * | 2/1977 | Frank ........................ 29/455.1 |
| 4,142,843 A | * | 3/1979 | Kish .......................... 417/313 |
| 4,149,501 A | | 4/1979 | Gropp ........................ 123/119 |
| 5,092,634 A | * | 3/1992 | Miller ........................ 285/222 |
| 5,324,084 A | * | 6/1994 | Bodas et al. ................ 285/222 |
| 6,206,437 B1 | * | 3/2001 | Humphreys ................. 285/353 |
| 6,505,614 B1 | * | 1/2003 | Hueniken et al. ...... 123/568.11 |

FOREIGN PATENT DOCUMENTS

FR    756 047    12/1933
WO   WO 01/27517    4/2001

OTHER PUBLICATIONS

PCT/CA 02/00559, International Search Report, Aug. 20, 2002.

* cited by examiner

Primary Examiner—Eric K. Nicholson

(57) ABSTRACT

A connection and a method of providing a connection includes a fluid tight communication between a valve and a tube. The valve includes a first surface, a second surface, a cavity, and an aperture extending through the valve between the first and second surfaces. The tube includes a first portion, a second portion and a third portion between the first and second portions. The first portion penetrates the first surface and extends through the aperture into the cavity. The third portion is deformed so as to engage the second surface.

6 Claims, 5 Drawing Sheets

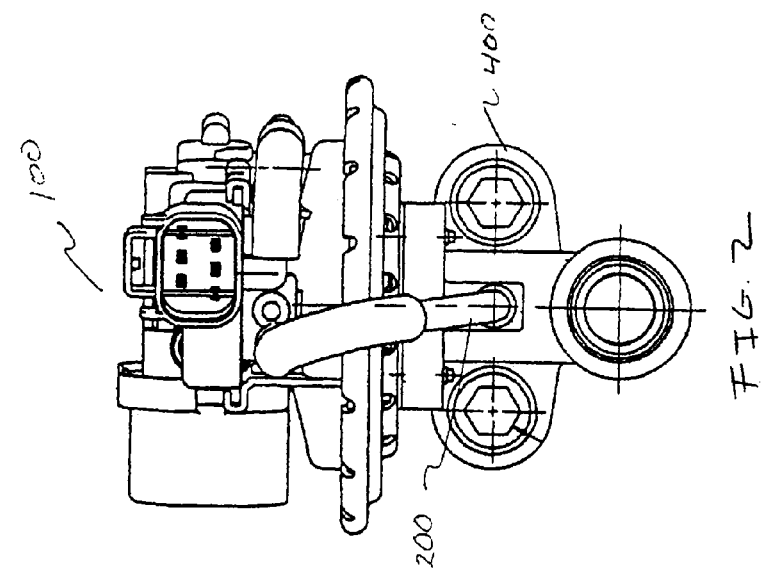
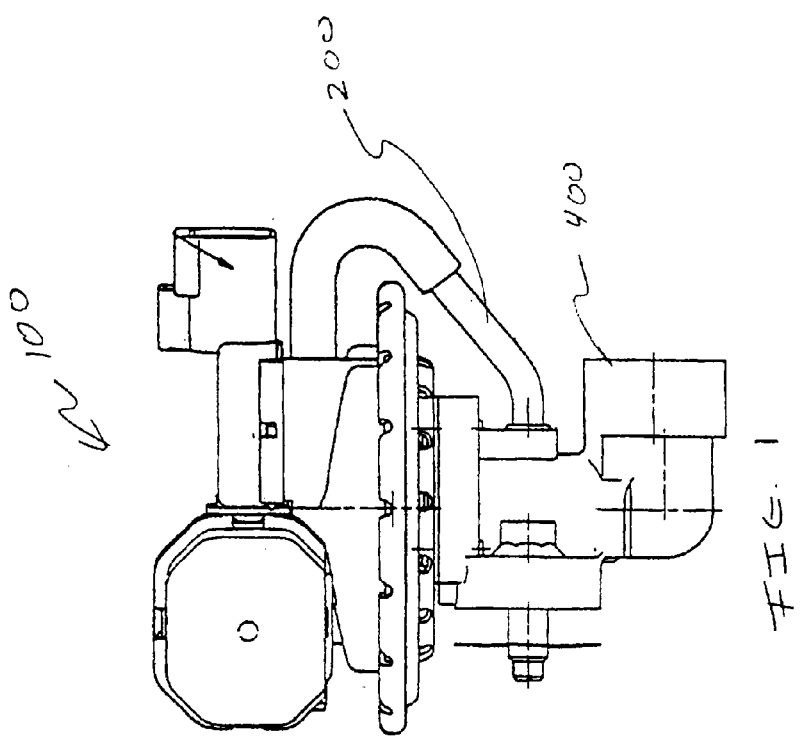

CONNECTION FORMED BY ENGAGEMENT OF A TUBE AND A VALVE SURFACE

RELATED APPLICATIONS

This application is a continuation-in-part of U.S. patent application Ser. No. 09/689,897, filed Oct. 13, 2000, now U.S. Pat. 6,505,614 which claims the benefit of the earlier filing date of U.S. Provisional Application No. 60/159,397, filed Oct. 14, 1999. The disclosures of both applications are incorporated by reference herein in their entireties.

FIELD OF THE INVENTION

This disclosure generally relates to a connection between a tube and a valve. In particular, this disclosure is directed to a connection between a differential pressure tube and an exhaust gas recirculation (EGR) valve in an EGR assembly.

BACKGROUND OF THE INVENTION

There are a variety of methods for securing a tube to an EGR valve. These methods (e.g., silver soldering, brazing, screw and locking tab features, etc.) use additional components or secondary operations. However, it is believed that these methods are expensive and time consuming to implement.

It is believed that there is a need to eliminate these additional components and secondary steps during the assembly process of an EGR assembly. Moreover, it is believed that there is a need to provide a connection that is well suited to withstand exhaust gas temperatures and vibration without loosening, rotating, or leaking.

SUMMARY OF THE INVENTION

The present invention provides a connection for communicating fluid. The connection comprises a body and a tube. The body has an exterior surface, an interior surface that defines a cavity, and a passage. The passage extends along an axis and connects the interior and exterior surfaces. The tube extends along the axis and is at least partially located within the passage. The tube includes a first portion, a second portion spaced along the axis from the first portion, and a third portion axially spaced between the first and second portions. The third portion is deformed to engage the interior surface and prevent rotation of the tube about the axis.

The present invention also includes an exhaust gas recirculation asssembly for communicating exhaust gas from an internal combustion engine. The assembly comprises a valve, a tube, and a connection between the valve and the tube. The valve has an exterior surface, an interior surface that defines a cavity, and a passage that extends along an axis and connects the interior and exterior surfaces. The tube extends along the axis and is at least partially located within the passage. The tube includes a first portion, a second portion spaced along the axis from the first portion, and a third portion axially spaced between the first and second portions. The connection prevents rotation of the tube about the axis and includes the third portion being deformed to engage the interior surface.

The present invention also includes a method of connecting an exhaust gas recirculation tube to an exhaust gas recirculation valve. The exhaust gas recirculation tube exends along an axis and includes a first portion, a second portion, and a third portion axially between the first and second portions. The exhaust gas recirculation valve includes an interior surface, an exterior surface, and a passage extending between the interior and exterior surfaces. The interior surface has a saddle formation that surrounds the passage. The method comprises inserting the first portion through the passage, engaging the second portion with the exterior surface; and deforming the third portion to engage the saddle formation. This deforming prevents relative rotation of the exhaust gas recirculation tube about the axis.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 1 is a front elevation view of an EGR assembly according to a preferred embodiment.

FIG. 2 is a right side elevation view of the EGR assembly of FIG. 1.

DETAILED DESCRIPTION OF THE PREFERRED EMBODIMENT

FIGS. 1–9 are directed to a preferred embodiment of a connection for communicating exhaust gas or another fluid. Although the connection is illustrated with reference to a valve body of an exhaust gas recirculation (EGR) assembly, the connection is not limited to use in an EGR assembly.

An EGR assembly 100 includes a differential pressure tube 200 and an EGR valve body 400.

Figure 3:
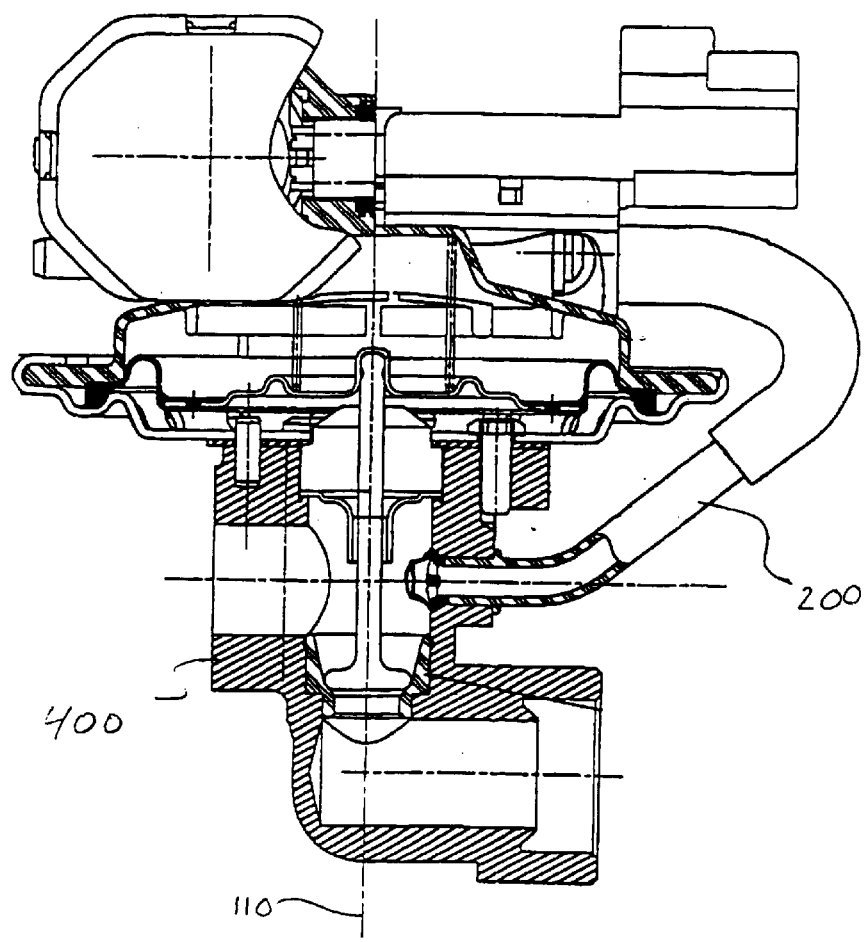
FIG. 3 is a partial cross-sectional view of the EGR assembly of FIG. 1.
Figure 5:
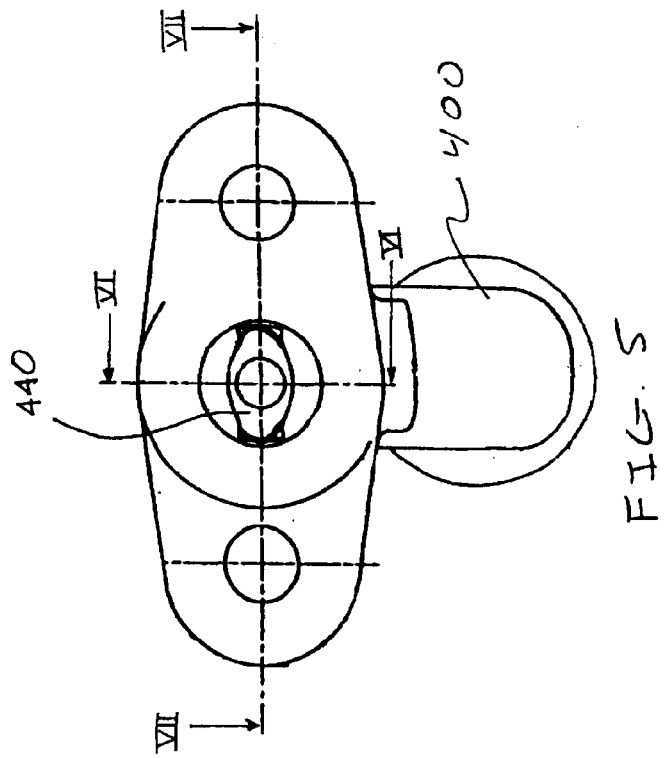
FIG. 5 is a left side elevation view of an EGR valve of the EGR assembly of FIG. 1.
Figure 4:
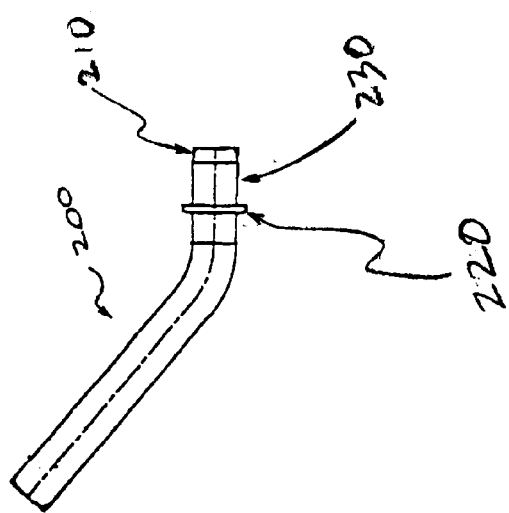
FIG. 4 is a back elevation view of an exhaust tube according to a preferred embodiment.
Figure 7:
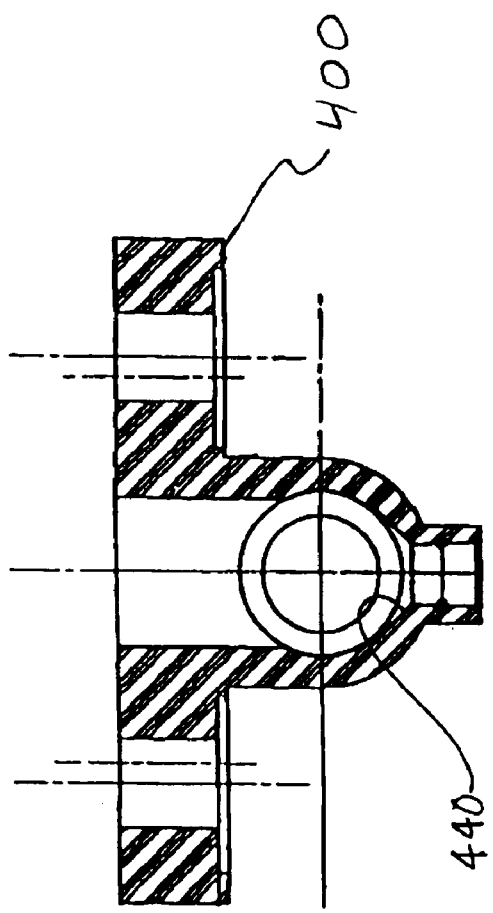
FIG. 7 is a cross-sectional view taken along line VIII—VIII in FIG. 5.
Figure 6:
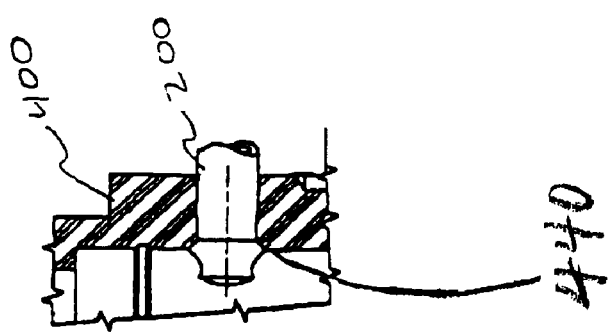
FIG. 6 is a cross-sectional detail view taken along line VI—VI in FIG. 5.

Referring particularly to FIG. 4, the tube 200 includes an end tip or first portion 210, an enlarged section or second portion 220, and a connecting or third portion 230. The third portion 230 is located between and connects the first portion 210 and the second portion 220. The first portion 210 can include a bevel 212 extending from a terminus of the tube 200. Such a bevel 212 may facilitate alignment and insertion of the tube 200 into the valve 400. For example, the bevel 212 can be a chamfer of about 10.5 degrees terminating at the edge of the first portion 210. Further, the second portion 220 can include a flange 222 to limit the insertion of the first portion 210 into the valve 400. The tube 200 can be fabricated of stainless steel or an equivalent material that is suitable for the required deformation and that is resistant to deterioration due to contact with exhaust gases.

The valve 400 includes an aperture 410 extending between a first surface 420 and a second surface 430. The aperture 410 is appropriately sized and shaped to receive the first portion 210. A friction or interference-type fit of about 0.1 mm between the aperture 410 and the first portion 210 can be used to aid in securing the tube 200 and the valve 400. The aperture 410 can also be tapered (see FIG. 8) to aid in assembly of the EGR assembly 100. For example, the taper can be about 2 degrees and can also include at its mouth a chamfer (not shown) of about 0.5 inches by 45 degrees.

The first portion 210 is inserted into the aperture 410 until the flange 222 contiguously engages the first surface 420, and the third portion 230 is then deformed to engage the second surface 420.

At least one of the first surface 420 and the second surface 430 can be generally cylindrical or can be generally flat. A cylindrical second surface 430 surrounding an axis 110 (see FIG. 3) results in a saddle-shape, indicated as 440 in the figures, at an intersection of cylindrical surface 430 and the aperture 410. The saddle 440 can have a taper, and the taper can include a chamfer at its mouth.

The lengths of the tube 200 and the aperture 410 are determined such that when the first portion 210 penetrates the first surface 420 and extends through the aperture 410, the end portion 210 and the third portion 230 extend beyond the second surface 430 into the interior of the valve 400.

Figure 9:
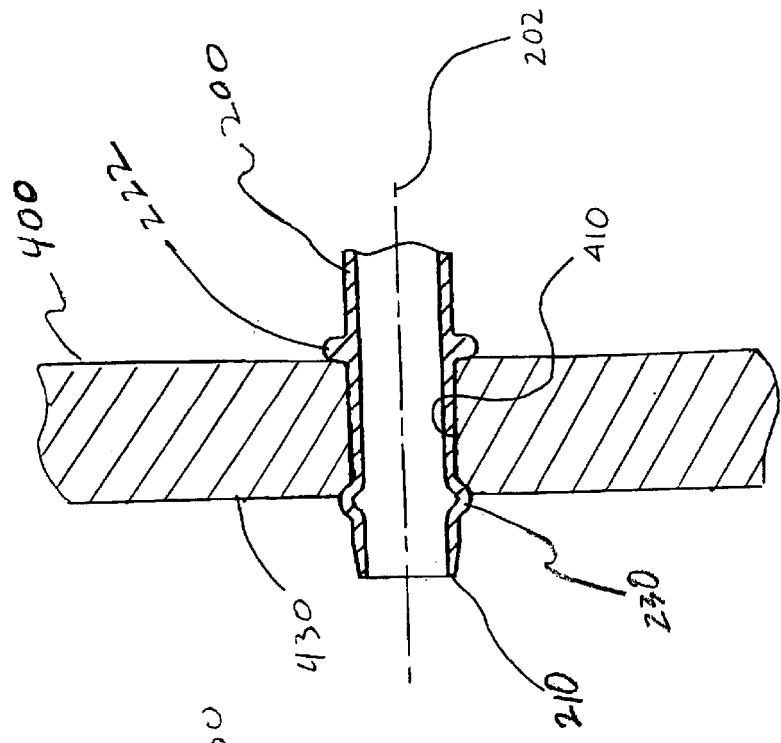
FIG. 9 is a cross-sectional detail view, similar to FIG. 6, showing a deformed exhaust tube.
Figure 8:
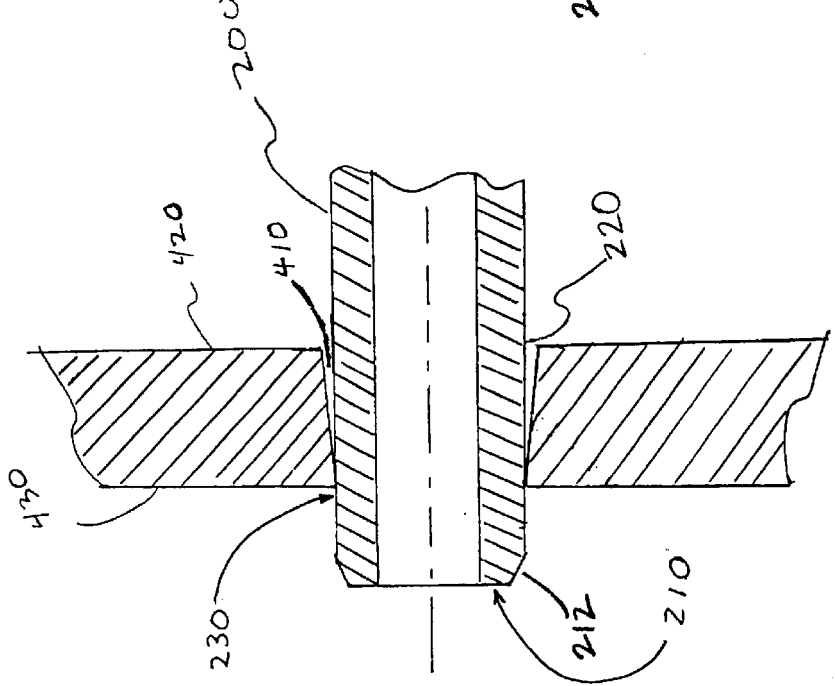
FIG. 8 is a cross-sectional detail view, similar to FIG. 6, showing a non-deformed exhaust tube.

As shown in FIG. 9, the third portion 230 is deformed to engage the second surface 430, so as to assist in forming a connection between the tube 200 and the valve 400. In particular, the third portion 230 can be "upset" with a socket-like tool that engages the first portion 210 and is displaced along a longitudinal axis 202 so as to distend the third portion 230 radially outward and to contiguously engage the second surface 430.

Alternatively, the third portion 230 can be deformed at one point, or can be deformed at a plurality of points, which can be spaced at equiangular intervals around the longitudinal axis 202. For example, the third portion 230 can be deformed at four points, arranged at equally spaced intervals, e.g., 90 degree angles, around the longitudinal axis 202 of the tube 200. The third portion 230 can be deformed to contiguously engage the second surface 430. For example, the third portion 230 can be deformed to contiguously engage the saddle 440, and can more specifically be deformed to contiguously engage the taper or chamfer of the saddle 440. The third portion 230 can be deformed at a point aligned along a minor axis of the saddle 440 to further prevent rotation of the tube 200 relative to the valve 400 during use of the EGR assembly 100.

A staking process can accomplish deformation of the third portion 230. A staking tool having a cruciform tip that is similar in geometry to a Phillips screwdriver can be used. The tip of the staking tool can include a first pair of elongate staking surfaces that are longer than and perpendicular to a second pair of staking surfaces. The first pair of staking surfaces can be aligned along one of the major and minor axis of the saddle 440, thereby further securing the tube 200 relative to the valve 400.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A connection for communicating fluid, the connection comprising:

a body having an exterior surface, an interior surface defining a generally cylindrical volume having a central axis, and a passage extending along an axis generally perpendicular to the central axis and connecting the interior and exterior surfaces; and a tube extending along the axis and being at least partially located within the passage, the tube including:
a first portion,
a second portion spaced alone the axis from the first portion, and
a third portion axially spaced between the first and second portions, the third portion being deformed to engage the interior surface and prevent rotation of the tube about the axis;

wherein the interior surface includes a saddle formation surrounding the passage, the saddle formation being defined by the intersection of the passage with the interior surface, and the third portion includes deformation engaging the saddle formation so as to prevent the tube from rotating about the axis.

2. The connection according to claim 1, wherein the second portion comprises a flange contiguously engaging the exterior surface.

3. The connection according to claim 1, wherein the passage comprises a taper.

4. The connection according to claim 3, wherein the taper comprises a first aperture at the exterior surface and a second aperture at the interior surface, and wherein the first aperture has a larger area relative to the second aperture.

5. The connection according to claim 1, wherein the first portion comprises a bevel portion.

6. The connection according to claim 5, wherein the bevel extends along the axis from a terminus of the tube toward the third portion, and wherein the bevel has a minimal cross-section at the terminus.

\* \* \* \* \*